United States Patent
Xu et al.

(10) Patent No.: US 11,050,052 B2
(45) Date of Patent: Jun. 29, 2021

(54) LITHIUM ION BATTERY AND NEGATIVE ELECTRODE MATERIAL THEREOF

(71) Applicant: Contemporary Amperex Technology Co., Limited, Fujian (CN)

(72) Inventors: Wenzhu Xu, Fujian (CN); Jianqing Sun, Fujian (CN); Guangbo Lu, Fujian (CN); Fan Sun, Fujian (CN); Qifan Zou, Fujian (CN); Shengwei Wang, Fujian (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 130 days.

(21) Appl. No.: 16/432,958

(22) Filed: Jun. 6, 2019

(65) Prior Publication Data
US 2019/0288279 A1    Sep. 19, 2019

Related U.S. Application Data

(63) Continuation of application No. PCT/CN2017/092316, filed on Jul. 9, 2017.

(30) Foreign Application Priority Data

Dec. 6, 2016 (CN) .......................... 201611111106.4

(51) Int. Cl.
*H01M 4/36* (2006.01)
*H01M 4/587* (2010.01)
(Continued)

(52) U.S. Cl.
CPC .......... *H01M 4/364* (2013.01); *H01M 4/131* (2013.01); *H01M 4/1393* (2013.01);
(Continued)

(58) Field of Classification Search
CPC .... H01M 4/1393; H01M 4/625; H01M 4/364; H01M 4/366; H01M 4/131; H01M 4/485; H01M 4/505; H01M 4/525; H01M 4/58; H01M 4/587; H01M 10/0525; H01M 2004/021; H01M 2004/027
See application file for complete search history.

(56) References Cited

U.S. PATENT DOCUMENTS

2009/0098448 A1* 4/2009 Ozaki ................... H01M 4/133
                                                                 429/129

FOREIGN PATENT DOCUMENTS

CN          102610791 A   *   7/2012

OTHER PUBLICATIONS

EPO website (www.espacenet.com) machine translation of CN 102610791A. (Year: 2012).*

* cited by examiner

*Primary Examiner* — Gregg Cantelmo

(57) ABSTRACT

The present invention provides a lithium ion battery and a negative electrode material thereof. The negative electrode material includes a mixture of a graphite and an amorphous carbon, wherein the graphite is subjected to a surface treatment, and the surface treatment manner is a combination of mechanical fusion modification and spray drying coating, and wherein the graphite has a graphitization degree of 90-96%, an average particle diameter D50 of 13-25 μm and a specific surface area BET of 0.8-2.5 m²/g, and the amorphous carbon has a graphitization degree of 65-80%, an average particle diameter D50 of 2-15 μm and a specific surface area BET of 1.0-3.0 m²/g.

17 Claims, 1 Drawing Sheet

(51) Int. Cl.
*H01M 10/0525* (2010.01)
*H01M 4/485* (2010.01)
*H01M 4/58* (2010.01)
*H01M 4/131* (2010.01)
*H01M 4/505* (2010.01)
*H01M 4/525* (2010.01)
*H01M 4/1393* (2010.01)
*H01M 4/62* (2006.01)
*H01M 4/02* (2006.01)

(52) U.S. Cl.
CPC ........... *H01M 4/366* (2013.01); *H01M 4/485* (2013.01); *H01M 4/505* (2013.01); *H01M 4/525* (2013.01); *H01M 4/58* (2013.01); *H01M 4/587* (2013.01); *H01M 4/625* (2013.01); *H01M 10/0525* (2013.01); *H01M 2004/021* (2013.01); *H01M 2004/027* (2013.01)

US 11,050,052 B2

LITHIUM ION BATTERY AND NEGATIVE ELECTRODE MATERIAL THEREOF

CROSS REFERENCE TO RELATED APPLICATIONS

The present application is a Continuation Application of PCT Application No. PCT/CN2017/092316 filed on Jul. 9, 2017, which claims the priority of Chinese Patent Application No. 201611111106.4 filed on Dec. 6, 2016. The contents of all of the above are incorporated herein by reference in their entirety.

FIELD OF THE INVENTION

The present invention generally relates to new energy materials and, more particularly, relates to a lithium ion battery and a negative electrode material thereof having desirable dynamic performance, cycle performance and storage performance.

BACKGROUND OF THE INVENTION

Lithium ion batteries have been widely used in mobile electronic devices, such as mobile phones, portable computers, video camera, photographic camera in recent years due to high specific energy, high operating voltage, wide temperature range of application, low self-discharge rate, long cycle life, no pollution and good safety performance. In recent years, traditional batteries are also gradually replaced in the fields of aviation, aerospace, marine, satellite, small medical instruments and military communication equipment.

Lithium ion battery generally includes a positive electrode, a negative electrode, a separator, and an electrolyte. Wherein, the negative electrode includes a negative electrode current collector and a negative electrode film formed on the negative electrode current collector, and the negative electrode film includes a negative electrode material, a binder and a conductive agent.

At present, carbon materials are the most widely used negative electrode material in lithium ion batteries. The carbon material can be divided into graphite material and amorphous carbon material. The graphite material can be further divided into natural graphite and artificial graphite. The amorphous carbon material can be further divided into soft carbon and hard carbon. Natural graphite has high energy density, wide source and low price, but has poor cycle life and poor large rate charge-discharge capacity. Therefore, use of natural graphite in power batteries is limited. The artificial graphite has stable structure and can realize large current discharge and, therefore, has a long cycle life. The artificial graphite has been widely studied and applied in the field of power batteries, but its preparation process is complicated and the cost is high.

In carbon-based negative electrode materials, the structure and capacity of the carbon material can be determined by controlling the graphitization degree thereof, so as to determine the properties of the material. Generally, materials with low graphitization degree have low capacity and poor dynamic performance, but have good cycle performance and storage properties due to stable internal structure. The graphite material with a high graphitization degree has high capacity and good dynamic performance. However, lithium insertion/extraction reaction of the negative electrode material is not timely when the battery is charged and discharged quickly, and the voltage of the battery reaches the lower limit or the upper limit rapidly. After that, the reaction cannot be carried out, causing slightly poor storage performance and cycle performance. Therefore, how to balance the dynamic performance and cycle storage performance is a technical difficulty in the research and application of the negative electrode materials for power batteries.

To solve the technical problem as detailed above, prior art adopts lithium titanate as a negative electrode material. The lithium titanate has good dynamic performance and long life. However, the capacity of lithium titanate is low, and the price and the cost of lithium titanate is high. Therefore, lithium titanate is not a long-term plan for the future market development of lithium ion batteries.

In view of the foregoing, what is needed, therefore, is to provide a lithium ion battery having desirable dynamic performance and cycle storage performance and a negative electrode material thereof.

SUMMARY OF THE INVENTION

One object of the present invention is to provide a lithium ion battery having desirable dynamic performance and storage cycle performance and a negative electrode material thereof.

According to one embodiment of the present invention, a negative electrode material of a lithium ion battery includes a mixture of a graphite and an amorphous carbon, wherein the graphite is subjected to a surface treatment, and the surface treatment manner is a combination of mechanical fusion modification and spray drying coating, and wherein the graphite has a graphitization degree of 90-96%, an average particle diameter D50 of 13-25 µm and a specific surface area BET of 0.8-2.5 m$^2$/g, and the amorphous carbon has a graphitization degree of 65-80%, an average particle diameter D50 of 2-15 µm, and a specific surface area BET of 1.0-3.0 m$^2$/g.

According to one aspect of the present invention, the graphite has an average diameter D50 of 13-15 µm.

According to one aspect of the present invention, the amorphous carbon has an average particle diameter D50 of 5-15 µm.

According to one aspect of the present invention, a mass ratio of the graphite to the amorphous carbon is 1:1-9:1.

According to one aspect of the present invention, a mass content of the graphite in the total mass of the graphite and the amorphous carbon is 65-95%. The addition of the amorphous carbon can improve the circulation of the negative electrode material. However, the amorphous carbon has low capacity. To ensure good cycle performance and high capacity, the content of the amorphous carbon cannot be too high.

According to one aspect of the present invention, the graphite is subjected to a surface treatment, and the surface treatment manner is a combination of mechanical fusion modification and spray drying coating. The surface treatment can improve the interface of the graphite material and improve the dynamic performance thereof.

According to one aspect of the present invention, the surface treatment of the graphite includes the steps of:

(1) changing the morphology of the graphite via grinding or extruding with equipment, to obtain uncoated graphite particles; and (2) uniformly mixing the uncoated graphite particles in step (1) with a solution of a coating material to obtain a mixed solution, drying the mixed solution by a spray drying tower to obtain coated graphite particles having a particle diameter of 13-25 μm and a specific surface area of 0.8-2.5 m$^2$/g.

According to one aspect of the present invention, the coating material includes one or more of hard carbon, soft carbon, high molecular carbon material, asphalt, phenolic resin, amino phenolic resin, and coumarone resin.

The surface treatment has the following advantages. Firstly, the mechanical grinding can reduce the diameter of the graphite particles, improve the surface roughness of the graphite particles, optimize the interface, and improve the dynamic performance and the storage performance. Secondly, coating can further optimize the interface of the graphite, eliminate the active group on the surface of the graphite material, to improve the dynamic performance, the storage performance and the low temperature performance.

According to one aspect of the present invention, the amorphous carbon is one or more of soft carbon and hard carbon, preferably soft carbon.

Compared with the prior art, the negative electrode material for lithium ion battery of the present invention has the following advantages.

1) By mixing appropriate amount of amorphous carbon with graphite, the negative electrode material of the lithium ion battery can utilize the large interlayer distance of the amorphous carbon to greatly improve the lithium intercalation space of the negative electrode material, expand the diffusion channel of lithium ion in the carbon atom layer, and improve the cycle performance and the storage performance.

2) The negative electrode material of lithium ion battery uses graphite with small particle diameter and small specific surface area. The small particle size can shorten the motion path of the lithium ion, to improve the dynamic performance. The small specific surface area can inhibit the volume expansion of the graphite during the cycle reaction process, and improve the cycle performance and the storage performance.

3) The graphite and the amorphous carbon of the negative electrode material of the lithium ion battery have good mass productivity, low cost, simple preparation method and high practical application value.

According to another embodiment of the present invention, a lithium ion battery includes a negative electrode, a positive electrode, a separator, and an electrolyte, the negative electrode includes a negative electrode material, wherein the negative electrode material includes a mixture of a graphite and an amorphous carbon, the graphite is subjected to a surface treatment, and the surface treatment manner is a combination of mechanical fusion modification and spray drying coating, the graphite has a graphitization degree of 90-96%, an average particle diameter D50 of 13-25 μm and a specific surface area BET of 0.8-2.5 m$^2$/g; the amorphous carbon has a graphitization degree of 65-80%, an average particle diameter D50 of 2-15 μm and a specific surface area BET of 1.0-3.0 m$^2$/g.

According to one aspect of the present invention, the positive electrode includes a positive electrode material being capable of providing lithium ions, or being capable of inserting or extracting lithium ions.

According to one aspect of the present invention, the positive electrode material is selected from a group consisting of layered lithium cobaltate, spinel type lithium manganese oxide, layered lithium nickel cobalt manganese oxide, lithium titanium phosphate, lithium cadmium phosphate, lithium zirconium phosphate, and lithium iron phosphate.

According to one aspect of the present invention, the separator may be any separator material in the existing lithium ion battery, such as polyethylene, polypropylene, polyvinylidene fluoride, and a multilayer film thereof.

According to one aspect of the present invention, the electrolyte may be an electrolyte including a nonaqueous solvent and a lithium salt dissolved therein.

Compared with the prior art, the lithium ion battery of the present invention has desirable dynamic performance, cycle performance and storage performance, long lifetime, low production cost, as well as good application prospects.

BRIEF DESCRIPTION OF THE DRAWINGS

Other advantages and novel features will be drawn from the following detailed description of preferred embodiments with the attached drawings. The accompanying drawings, which are incorporated in and constitute a part of this specification, illustrate embodiments of the present invention and, together with a general description of the invention given above, and the detailed description of the embodiments given below, serve to explain the principles of the invention, in which.

DETAILED DESCRIPTION OF THE INVENTION

Figure 1:
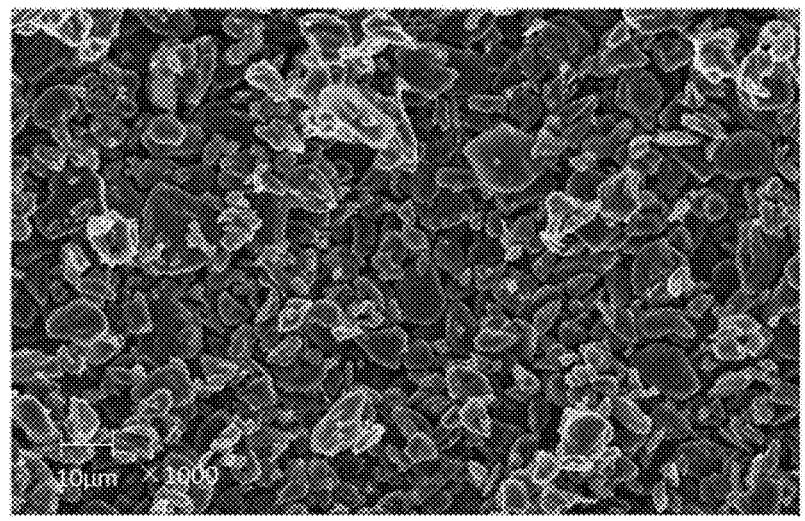
FIG. 1 depicts a scanning electron micrograph of the graphite used for the negative electrode material of a lithium ion battery according to one embodiment of the present invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

Example 1

Figure 2:
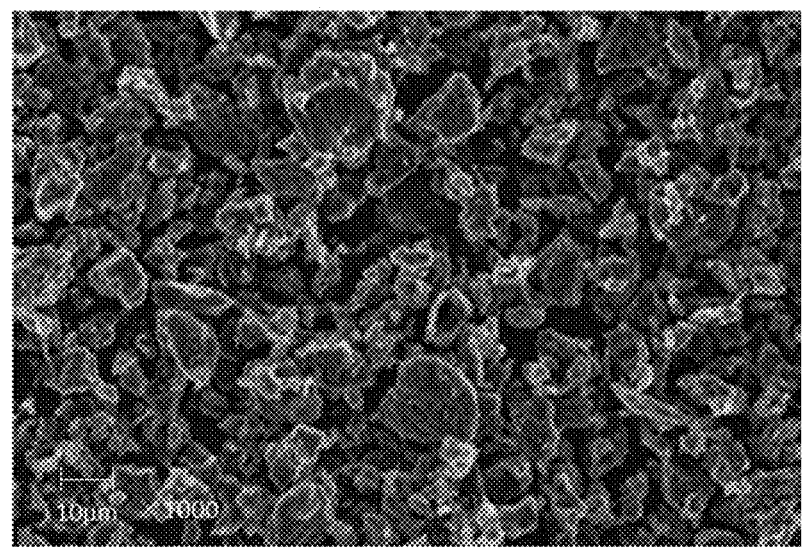
FIG. 2 depicts a scanning electron micrograph of the carbon material used for the negative electrode material of a lithium ion battery according to one embodiment of the present invention.

The lithium ion battery and a negative electrode material thereof are prepared by the following steps:

Selecting an artificial graphite modified by mechanical fusion (graphitization degree is 90%, D50 particle diameter is 12 μm, specific surface area is 2.0 m$^2$/g), adding a phenolic resin solution with a mass content of 15%, stirring for 2 h at a stirring frequency of 30 Hz, to obtain a mixed solution, a scanning electron micrograph of the artificial graphite is shown in FIG. 1; Drying the mixed solution by a spray drying tower, the spray drying temperature is 550° C. and the working time is 2 h, the coated artificial graphite particles having a particle diameter of 13 μm and a specific surface area of 1.5 m$^2$/g are obtained. The amorphous carbon is hard carbon having a graphitization degree of 65%, a D50 particle diameter of 7 μm, and a specific surface area of 1.5 m$^2$/g. A scanning electron micrograph of the hard carbon is shown in FIG. 2. Mixing the coated artificial graphite and hard carbon at a mass ratio of 90:10, to obtain the negative electrode material for a lithium ion battery. Mixing the negative electrode material, the conductive agent and the binder at a weight ratio of 94.5 wt %, 2 wt %, and 3.5 wt % and stirring to obtain a negative electrode slurry. Preparing a hard shell battery cell with a capacity of 42 Ah, using lithium iron phosphate as a positive electrode material, EC/DEC as an electrolyte and polyethylene as a separator. The electrochemical performance of the battery cells are tested and shown in Table 1.

Example 2

Selecting the natural graphite modified by mechanical fusion (graphitization degree is 96%, D50 particle diameter is 13 μm, specific surface area is 2.5 m$^2$/g), adding the phenolic resin solution with a mass content of 20%, stirring for 3 h at a stirring frequency of 25 Hz, to obtain a mixed solution. Drying the mixed solution by a spray drying tower, the spray drying temperature is 450° C. and the working time is 3 h, the coated natural graphite particles having a particle diameter of 14 μm and a specific surface area of 1.7 m$^2$/g are obtained. The amorphous carbon is the same as that of example 1. Mixing the coated natural graphite and the hard carbon at a mass ratio of 70:30, so as to obtain the negative electrode material for a lithium ion battery. The other steps are the same as the Example 1.

Example 3

Selecting the artificial graphite modified by mechanical fusion (graphitization degree is 90%, D50 particle diameter is 15 μm, specific surface area is 3 m$^2$/g), adding the phenolic resin solution with a mass content of 15%, stirring for 2 h at a stirring frequency of 30 Hz, to obtain a mixed solution. Drying the mixed solution by a spray drying tower, the spray drying temperature is 550° C. and the working time is 2 h, the coated artificial graphite particles having a particle diameter of 16 μm and a specific surface area of 2 m$^2$/g are obtained. The amorphous carbon is hard carbon having a graphitization degree of 80%, a D50 particle diameter of 15 μm, and a specific surface area of 1.0 m$^2$/g. Mixing the coated artificial graphite and the hard carbon at a mass ratio of 50:50. The others are the same as the Example 1.

Example 4

Selecting the natural graphite modified by mechanical fusion (graphitization degree is 96%, D50 particle diameter is 17 μm, specific surface area is 2.5 m$^2$/g), adding a phenolic resin solution with a mass content of 20%, stirring for 3 h at a stirring frequency of 25 Hz, to obtain a mixed solution. Drying the mixed solution by a spray drying tower, the spray drying temperature is 450° C. and the working time is 3 h, the coated natural graphite particles having a particle diameter of 19 μm and a specific surface area of 1.9 m$^2$/g are obtained. The amorphous carbon is soft carbon having a graphitization degree of 80%, a D50 particle diameter of 15 μm, and a specific surface area of 1.1 m$^2$/g. Mixing the coated natural graphite and the soft carbon at a mass ratio of 50:50. The others are the same as the Example 1.

Comparative Example 1

Selecting the artificial graphite without surface treatment (graphitization degree is 90%, D50 particle diameter is 12 μm, specific surface area is 2.0 m$^2$/g), adding the phenolic resin solution with a mass content of 15%, stirring for 2 h at a stirring frequency of 30 Hz, to obtain a mixed solution. Drying the mixed solution by a spray drying tower, the spray drying temperature is 550° C. and the working time is 2 h, the particle diameter of the discharge is 13 μm, the specific surface area is 1.5 m$^2$/g. Mixing the artificial graphite, the conductive agent and the binder at a weight ratio of 94.5 wt %, 2 wt %, 3.5 wt % and stirring. The others are the same as Example 1.

Comparative Example 2

The Comparative Example 2 is different from Example 1 only in that the active material of the negative electrode is hard carbon, having a graphitization degree of 65%, a D50 particle diameter of 7 μm, a specific surface area of 1.5 m$^2$/g. Mixing the hard carbon, the conductive agent, and the binder at a weight ratio of 94.5 wt %, 2 wt %, 3.5 wt % and stirring. The others are the same as Example 1.

Comparative Example 3

Comparative Example 3 is different from Example 1 in that the artificial graphite without surface treatment is used. The artificial graphite has a graphitization degree of 90%, a D50 particle diameter of 15 μm and a specific surface area of 2 m$^2$/g. The active material of the negative electrode is a hard carbon having a graphitization degree of 65%, a D50 particle diameter of 7 μm, and a specific surface area of 1.5 m$^2$/g. The others are the same as Example 1.

Electrochemical Performance Test

Specific power test method: discharging the battery cell at a rate of 40 C, 30 C for 10 s, standing the battery cell for 30 min, then charging the battery cell at 10 C for 10 s, standing the battery cell for 15 min.

Cycle characteristic test method: First, testing the first capacity of the battery cell, charging the battery cell at a constant current of 1 C to reach a voltage of 3.65V, then charging the battery cell at a constant voltage of 3.65V to reach an off current of 0.05 C, after standing the battery cell for 5 min, discharging the battery at 1 C to reach a voltage 2.5 V; Second, cycle performance test, charging the battery cell at a constant current of 3 C to reach a voltage 3.65V, constant voltage to 0.05 C, after standing the battery cell for 5 min, discharging the battery cell at a constant current of 3 C to reach a voltage 2.5V, the battery cell is repeatedly circulated according to the above conditions until the cell capacity decays to 80% of the first capacity.

The results of test are shown in Table 1.

TABLE 1

Electrochemical performance test results of the battery cells of Examples and Comparative Examples

|  | Graphitization degree of graphite | Graphitization degree of carbon material | The content of graphite (mass percentage) | The content of carbon material (mass percentage) | Power density (W/kg) | Cycle result |
|---|---|---|---|---|---|---|
| Example 1 | 90% | 65% | 90% | 10% | 2534 | 6000 |
| Example 2 | 96% | 65% | 70% | 30% | 2979 | 5500 |
| Example 3 | 90% | 80% | 50% | 50% | 2211 | 7000 |
| Example 4 | 96% | 80% | 50% | 50% | 2386 | 6500 |
| Comparative Example 1 | 90% | / | 100% | / | 3004 | 4000 |

TABLE 1-continued

Electrochemical performance test results of the battery cells of Examples and Comparative Examples

| | Graphitization degree of graphite | Graphitization degree of carbon material | The content of graphite (mass percentage) | The content of carbon material (mass percentage) | Power density (W/kg) | Cycle result |
|---|---|---|---|---|---|---|
| Comparative Example 2 | / | 65% | / | 100% | 2194 | 8000 |
| Comparative Example 3 | 90% | 65% | 90% | 10% | 2253 | 7000 |

As can be seen from Table 1, the negative electrode material of Comparative Example 1 is graphite having a high graphitization degree which has good dynamic performance but poor cycle storage performance. The negative electrode material of Comparative Example 2 is amorphous carbon having a low graphitization degree which has poor dynamic performance but good cycle storage performance. The negative electrode material of Comparative Example 3 is a composite as same as that of Example 1, including uncoated highly graphitized graphite and amorphous carbon. Compared with Comparative Examples 1 and 2, in Examples 1 to 4 of the present invention, the graphite having higher graphitization degree and the amorphous carbon having lower graphitization degree are mixed to form the active material of the lithium ion negative electrode and to prepare the negative electrode of the lithium ion battery, and the specific power of the obtained sample battery is higher than that of the comparative example 2. At a specific ratio of graphite to carbon material, the specific power is even close to that of Comparative example 1. The cycle performances of the batteries of Examples 1 to 4 are significantly higher than that of Comparative Example 1. At a specific ratio of graphite to amorphous carbon, the specific power is even close to that of Comparative example 2. Therefore, the lithium ion battery having the negative electrode material of the present invention as the negative electrode active material has desirable dynamic performance, cycle performance and storage performance.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments, it should be appreciated that alternative embodiments without departing from the scope of the appended claims. Although specific terms are employed herein, they are used in a generic and descriptive sense only and not for purposes of limitation.

What is claimed is:

1. A negative electrode material of a lithium ion battery, comprising a mixture of a graphite and an amorphous carbon, wherein the graphite is subjected to a surface treatment, and the surface treatment manner is a combination of mechanical fusion modification and spray drying coating, and wherein the graphite has a graphitization degree of 90-96%, an average particle diameter D50 of 13-25 μm and a specific surface area BET of 0.8-2.5 $m^2/g$; the amorphous carbon has a graphitization degree of 65-80%, and an average particle diameter D50 of 2-15 μm and a specific surface area BET of 1.0-3.0 $m^2/g$.

2. The negative electrode material according to claim 1, wherein the graphite has an average diameter D50 of 13-15 μm.

3. The negative electrode material according to claim 1, wherein the graphite has a specific surface area BET of 1.0-1.8 $m^2/g$.

4. The negative electrode material according to claim 1, wherein the amorphous carbon has an average particle diameter D50 of 5-15 μm.

5. The negative electrode material according to claim 1, wherein a mass ratio of the graphite to the amorphous carbon is 1:1-9:1.

6. The negative electrode material according to claim 5, wherein a mass content of the graphite in a total mass of the graphite and the amorphous carbon is 65-95%.

7. The negative electrode material according to claim 1, wherein the surface treatment of the graphite comprising the steps of:
   (1) changing the morphology of the graphite via grinding or extruding with equipment, to obtain uncoated graphite particles; and
   (2) uniformly mixing the uncoated graphite particles in step (1) with a solution of a coating material to obtain a mixed solution, drying the mixed solution by a spray drying tower to obtain coated graphite particles having a particle diameter of 13-25 μm and a specific surface area of 0.8-2.5 $m^2/g$.

8. The negative electrode material according to claim 7, wherein the coating material comprises one or more of hard carbon, soft carbon, high molecular carbon material, asphalt, phenolic resin, amino phenolic resin, and coumarone resin.

9. The negative electrode material according to claim 1, wherein the amorphous carbon is one or more of soft carbon and hard carbon.

10. The negative electrode material according to claim 9, wherein the amorphous carbon is soft carbon.

11. A lithium ion battery, comprising a negative electrode, a positive electrode, a separator, and an electrolyte, the negative electrode comprises a negative electrode material, wherein the negative electrode material comprises a mixture of a graphite and an amorphous carbon, the graphite is subjected to a surface treatment, and the surface treatment manner is a combination of mechanical fusion modification and spray drying coating, the graphite has a graphitization degree of 90-96%, an average particle diameter D50 of 13-25 μm and a specific surface area BET of 0.8-2.5 $m^2/g$; and the amorphous carbon has a graphitization degree of 65-80%, an average particle diameter D50 of 2-15 μm and a specific surface area BET of 1.0-3.0 $m^2/g$.

12. The lithium ion battery according to claim 11, wherein the positive electrode comprises a positive electrode material, the positive electrode material is one or more selected from a group consisting of a layered lithium cobaltate, a layered lithium nickel cobalt manganese oxide, a spinel type lithium manganese oxide, lithium titanium phosphate, lithium cadmium phosphate, lithium zirconium phosphate, and lithium iron phosphate.

13. The lithium ion battery according to claim 11, wherein the graphite has an average diameter D50 of 13-15 μm.

14. The lithium ion battery according to claim 11, wherein the graphite has a specific surface area BET of 1.0-1.8 $m^2/g$.

15. The lithium ion battery according to claim 11, wherein the amorphous carbon has an average particle diameter D50 of 5-15 μm and a specific surface area BET of 1.0-1.5 $m^2/g$.

16. The lithium ion battery according to claim 11, wherein a mass ratio of the graphite to the amorphous carbon is 1:1-9:1.

17. The lithium ion battery according to claim 16, wherein a mass content of the graphite in a total mass of the graphite and the amorphous carbon is 65-95%.

* * * * *